F. YOKEL.
OIL HEATER.
APPLICATION FILED AUG. 25, 1917.
1,349,484. Patented Aug. 10, 1920.
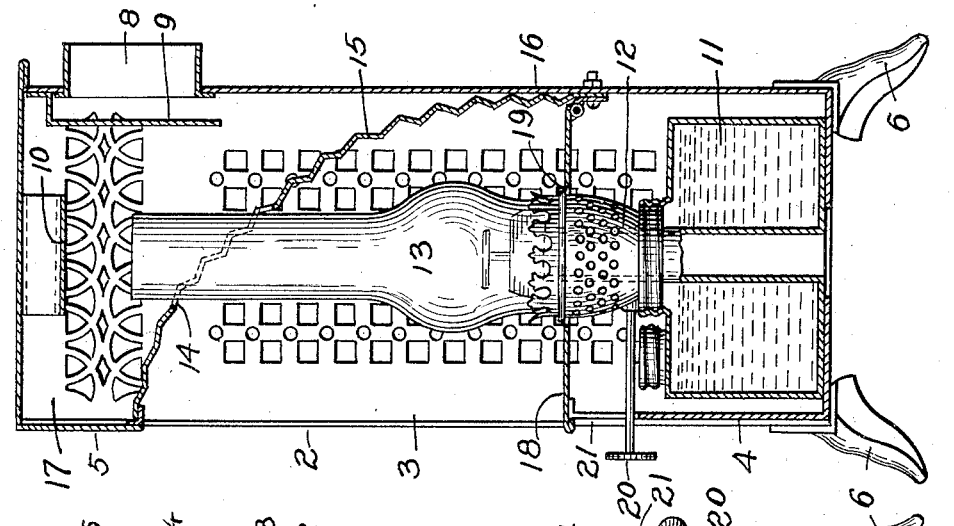
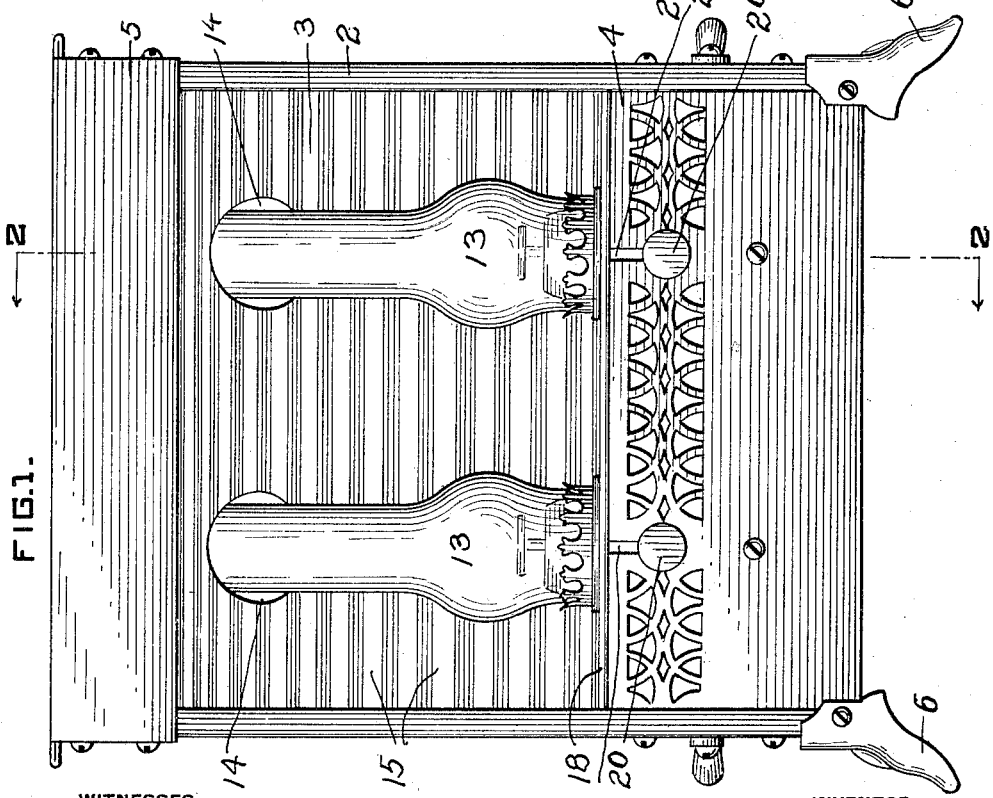
WITNESSES
J. Herbert Bradley.
Lois Vrueman.
INVENTOR
Frank Yokel
by W. T. Doolittle
Attorney

UNITED STATES PATENT OFFICE.

FRANK YOKEL, OF PITTSBURGH, PENNSYLVANIA, ASSIGNOR TO PITTSBURGH LAMP, BRASS & GLASS COMPANY, OF PITTSBURGH, PENNSYLVANIA.

OIL-HEATER.

1,349,484.

Specification of Letters Patent.   Patented Aug. 10, 1920.

Application filed August 25, 1917.  Serial No. 188,113.

*To all whom it may concern:*

Be it known that I, FRANK YOKEL, a citizen of the United States, residing at Pittsburgh, in the county of Allegheny and State of Pennsylvania, have invented certain new and useful Improvements in Oil-Heaters, of which the following is a specification.

The prime object of my invention is to provide a new and improved heater of simple and efficient construction designed to employ oil or other suitable fluid as a fuel.

In the accompanying drawing, which illustrates an application of my invention,

Figure 1 is a front elevational view of a heater embodying my invention; and

Fig. 2 is a vertical sectional view taken on line 2—2 of Fig. 1.

Referring to the drawing, the heater as illustrated and preferred, comprises an open front casing 2 preferably constructed of stamped sheet metal. The open front portion 3 extends from the lower front portion 4 of the casing to the upper front portion 5. The casing is designed to be supported on suitable feet 6, and the portion 4 as well as the sides of the casing are formed with openings for the passage of air. The upper portion of the back of the casing is provided with an opening 8 adapted to communicate with a pipe, not shown, whereby the products of combustion may be led to any desired point. 9 designates a baffle plate disposed in the interior of the casing and in front of the opening 8, and 10 is a plate extending laterally of and secured to the top member of the casing to protect the top.

Located within the interior of the casing and near the bottom thereof, I provide a removable fuel container 11, said container being adapted to receive a burner, or, as shown, a plurality of burners 12, of a central draft lamp construction. The chimneys 13 of the lamps project upwardly and have their upper ends entered in apertures 14 of a heat reflecting plate 15. This plate 15 having an outer polished surface is secured at its lower end to the back 16 of the casing and extends upwardly and substantially parallel therewith for a distance, and is then bent or curved outwardly so that its upper portion will be projected sufficiently to engage the upper front portion 5 of the casing to which it is secured by suitable means. This disposition of the heat reflecting plate 15 forms with the top and upper portion of the back of the casing, a chamber 17 into which the products of combustion from the lamps discharge. The products of combustion may be led from chamber 17 through opening 8.

Located a slight distance above the top of the fuel container 11, I provide a hinged partition plate 18, said plate being connected with the back of the casing in any suitable manner. Partition plate 18 is formed with openings 19 adapted to have the burner structure of the lamps project upwardly therethrough. One function of the partition plate 18 is to keep the heat of the burners away from the fuel container or containers, a very important feature in heaters of this class.

The wick operating stems 20 of the lamps project outwardly through slots 21 formed in the lower front portion 4 of the casing, and it will be noted that the lamps may be easily regulated by means of the said regulating stems 20.

What I claim is:—

1. In an oil heating stove, the combination with a casing having its front formed with an upper and a lower closed portion and an open intermediate portion, of a removable oil burning structure of the central draft lamp type disposed in the casing including a reservoir, a burner and chimney, an apertured partition plate within the casing above the reservoir, and an apertured heat reflector plate within the casing secured to and extending upwardly from the rear wall of the casing to the upper front portion thereof, said chimney extending through the reflector.

2. In an oil heating stove, the combination with a casing having its front formed with an upper and a lower closed portion and an open intermediate portion, of a removable oil burning structure disposed in the casing including a reservoir, a burner, a wick adjusting member projecting through the lower closed portion of the front and a chimney, a hinged apertured partition plate secured to the rear wall of the casing above the reservoir, and an apertured heat reflector plate within the casing secured to and extending upwardly from the rear wall of the casing to the upper front portion thereof, said chimney extending through the reflector.

3. In an oil heating stove, the combination with a casing having an opening near its top for a flue connection and having its front formed with an upper and a lower closed portion and an open intermediate portion, of a removable oil burning structure of the central draft lamp type disposed in the casing including a reservoir, a burner and chimney, an apertured partition plate within the casing above the reservoir, and an apertured heat reflecting plate within the casing secured to and extending upwardly from the rear wall of the casing to the upper front portion thereof to form a chamber between the rear wall and the top of the casing, and a flue connection in communication with the chamber, said chimney extending through the reflector into said chamber.

In testimony whereof I affix my signature in presence of two witnesses.

FRANK YOKEL.

Witnesses:
MARY C. MANION,
LOIS WINEMAN.